United States Patent
Wen

(10) Patent No.: US 10,725,927 B2
(45) Date of Patent: Jul. 28, 2020

(54) METHOD AND APPARATUS FOR CO-MANAGED CACHE SYSTEM

(71) Applicant: Beijing Panyi Technology Co., Ltd., Beijing (CN)

(72) Inventor: Xingzhi Wen, Fremont, CA (US)

(73) Assignee: Beijing Panyi Technology Co., Ltd., Beijing (CN)

( * ) Notice: Subject to any disclaimer, the term of this patent is extended or adjusted under 35 U.S.C. 154(b) by 0 days.

(21) Appl. No.: 16/209,795

(22) Filed: Dec. 4, 2018

(65) Prior Publication Data
US 2019/0171574 A1 Jun. 6, 2019

Related U.S. Application Data

(60) Provisional application No. 62/594,379, filed on Dec. 4, 2017.

(51) Int. Cl.
| | |
|---|---|
| G06F 12/00 | (2006.01) |
| G06F 12/0891 | (2016.01) |
| G06F 12/0871 | (2016.01) |
| G06F 12/0884 | (2016.01) |
| G06F 12/0842 | (2016.01) |

(52) U.S. Cl.
CPC ...... *G06F 12/0891* (2013.01); *G06F 12/0842* (2013.01); *G06F 12/0871* (2013.01); *G06F 12/0884* (2013.01)

(58) Field of Classification Search
CPC ............. G06F 12/0891; G06F 12/0842; G06F 12/0884; G06F 12/0871; G06F 12/0815; G06F 12/0888
See application file for complete search history.

(56) References Cited

U.S. PATENT DOCUMENTS

| | | | |
|---|---|---|---|
| 6,339,813 B1* | 1/2002 | Smith, III | G06F 12/0859 711/133 |
| 2009/0154690 A1* | 6/2009 | Wu | G10L 15/34 379/386 |
| 2017/0192900 A1* | 7/2017 | Persson | G06F 12/128 |

* cited by examiner

*Primary Examiner* — Mardochee Chery
(74) *Attorney, Agent, or Firm* — K&L Gates LLP; Jordan A. Kwan

(57) ABSTRACT

Aspects of the present disclosure describe a cache system that is co-managed by software and hardware that obviates use of a cache coherence protocol. In some embodiments, a cache would have the following two hardware interfaces that are driven by software: (1) invalidate or flush its content to the lower level memory hierarchy; (2) specify memory regions that can be cached. Software would be responsible for specifying what regions can be cacheable, and may flexibly change memory from cacheable and not, depending on the stage of the software program. In some embodiments, invalidation can be done in one cycle. Multiple valid bits can be kept for each tag in the memory. A vector "valid bit vec" comprising a plurality of bits can be used. Only one of two bits may be used as the valid bit to indicate that this region of memory is holding valid information for use by the software.

12 Claims, 3 Drawing Sheets

| Valid bit | Tag field |
|---|---|
| Valid bit | Tag field |
| Valid bit | Tag field |
| Valid bit | Tag field |
| ... | ... |
| Valid bit | Tag field |
| Valid bit | Tag field |
| Valid bit | Tag field |
| Valid bit | Tag field |

METHOD AND APPARATUS FOR CO-MANAGED CACHE SYSTEM

CROSS REFERENCE TO RELATED APPLICATION

This application claims the benefit of U.S. Provisional Application 62/594,379, filed Dec. 4, 2017, and titled "MULTI-CORE PROCESSOR WITH SOFTWARE-HARDWARE CO-MANAGED CACHE SYSTEM," the disclosure of which is hereby incorporated herein in its entirety and for all purposes.

TECHNICAL FIELD

The subject matter disclosed herein generally relates to managing cache memory in a computer system. More specifically, the subject matter relates to methods and systems for a software-hardware co-managed cache system.

BACKGROUND

In parallel computing, low memory access latency is very important and challenging because multiple processor cores need to access memory simultaneously. In traditional multi-core processors, caches are used to reduce memory access latencies. However, cache coherence protocol needs to be implemented to provide a correct memory model to the programs. At large scales, cache coherence protocol for managing multiple cache systems may be very cumbersome and inefficient. It is desirable to improve the way cache is managed.

BRIEF SUMMARY

Aspects of the present disclosure are presented for a multi-core software-hardware co-managed cache system. In some embodiments, a method of a computer program for managing a cache memory executed in a computing environment is presented. The method may include: specifying a first region of memory to function as a read-only region; specifying the first region of memory to be cacheable while the first region of memory functions as a read-only region; specifying a second region of memory to function as a read-only region; specifying the second region of memory to be cacheable while the second region of memory functions as a read-only region; causing a write action in the first region of memory that changes memory content of the first region of memory; invalidating the first region of memory as cacheable upon causing the write action of the first region of memory; and maintaining the second region of memory as cacheable while the first region is invalidated as cacheable.

In some embodiments, the method further comprises: directing a first processor to perform a first write action in a third region of memory; directing a second processor to perform a second write action in the third region of memory, wherein the first write action does not possess any dependency with the section write action necessary to perform either the first or the second write actions; and based on not possessing any dependencies, specifying the third region of memory as a cacheable region while the first processor performs the first write action and the second processor performs the second write action.

In some embodiments, the second processor performs the second write action in parallel with the first processor performing the first write action.

In some embodiments, the first write action generates a first updated value in the third region of memory and the second write action generates a second updated value in the third region of memory, and the method further comprises: flushing the first updated value and the second updated value to a lower level memory region before the first updated value and the second update value are used by another processor.

In some embodiments, the first region of memory comprises a plurality of writeable memory registers, and invalidating the first region of memory occurs in one operation cycle.

In some embodiments, invalidating the first region of memory comprises: accessing a valid bit vector comprising at least a first bit indicating whether the first region of memory comprises valid information, and a second bit indicating whether the first region of memory is cacheable by the computer program; and updating the second bit to indicate that the first region of memory is no longer cacheable by the computer program.

In some embodiments, the method further comprises: initializing the first region of memory to be cacheable again by re-initializing the first bit and re-initializing the second bit.

In some embodiments, a computer apparatus is presented. The computer apparatus may include: at least one processor; a memory communicatively coupled to the at least one processor and configured to be cacheable by a software program. The at least one processor may be configured to execute instructions of the software program comprising: specifying a first region of the memory to function as a read-only region; specifying the first region of the memory to be cacheable while the first region of memory functions as a read-only region; specifying a second region of the memory to function as a read-only region; specifying the second region of the memory to be cacheable while the second region of memory functions as a read-only region; causing a write action in the first region of the memory that changes memory content of the first region of the memory; invalidating the first region of the memory as cacheable upon causing the write action of the first region of memory; and maintaining the second region of the memory as cacheable while the first region is invalidated as cacheable.

In some embodiments of the apparatus, the at least one processor is further configured to execute instructions by the software program further comprising: directing a first processor to perform a first write action in a third region of the memory; directing a second processor to perform a second write action in the third region of the memory, wherein the first write action does not possess any dependency with the section write action necessary to perform either the first or the second write actions; and based on not possessing any dependencies, specifying the third region of the memory as a cacheable region while the first processor performs the first write action and the second processor performs the second write action.

In some embodiments of the apparatus, the second processor performs the second write action in parallel with the first processor performing the first write action.

In some embodiments, the apparatus further includes a lower level memory communicatively coupled to the memory and the at least one processor; and the first write action generates a first updated value in the third region of the memory and the second write action generates a second updated value in the third region of the memory, and the instructions further comprise: flushing the first updated value and the second updated value to the lower level memory region before the first updated value and the second update value are used by another processor.

In some embodiments of the apparatus, the first region of the memory comprises a plurality of writeable memory registers, and invalidating the first region of memory occurs in one operation cycle.

In some embodiments of the apparatus, invalidating the first region of the memory comprises: accessing a valid bit vector comprising at least a first bit indicating whether the first region of the memory comprises valid information, and a second bit indicating whether the first region of the memory is cacheable by the computer program; and updating the second bit to indicate that the first region of the memory is no longer cacheable by the computer program.

In some embodiments of the apparatus, the instructions further comprise initializing the first region of the memory to be cacheable again by re-initializing the first bit and re-initializing the second bit.

In some embodiments, a method of a computer program for managing validity of cache regions for a multi-core processor is presented. The method may include: storing a first tag representing a first memory region and a first vector comprising at least a first bit and a second bit; storing a second tag representing a second memory region and a second vector comprising at least a third bit and a fourth bit; setting the first, second, third and fourth bit as zero; storing an active bit indicator; controlling the first bit to indicate whether the first memory region is a candidate for caching, and controlling the third bit to indicate whether the second memory region is a candidate for caching, when the active bit indicator is zero; and controlling the second bit to indicate whether the first memory region is a candidate for caching, and controlling the fourth bit to indicate whether the second memory region is a candidate for caching, when the active bit indicator is one.

BRIEF DESCRIPTION OF THE DRAWINGS

Some embodiments are illustrated by way of example and not limitation in the figures of the accompanying drawings.

DETAILED DESCRIPTION

In parallel computing, low memory access latency is very important and challenging because multiple processor cores need to access memory simultaneously. In traditional multi-core processors, caches are used to reduce memory access latencies. However, cache coherence protocol needs to be implemented to provide a correct memory model to the programs. At large scales, cache coherence protocol for managing multiple cache systems may be very cumbersome and inefficient.

Aspects of the present disclosure describe a cache system that is co-managed by software and hardware. This provides great performance for memory access without complicated hardware implementation in a large scale multi-core processor.

1. Multi-Core Processor with Cache Coherence Protocol

Figure 1:
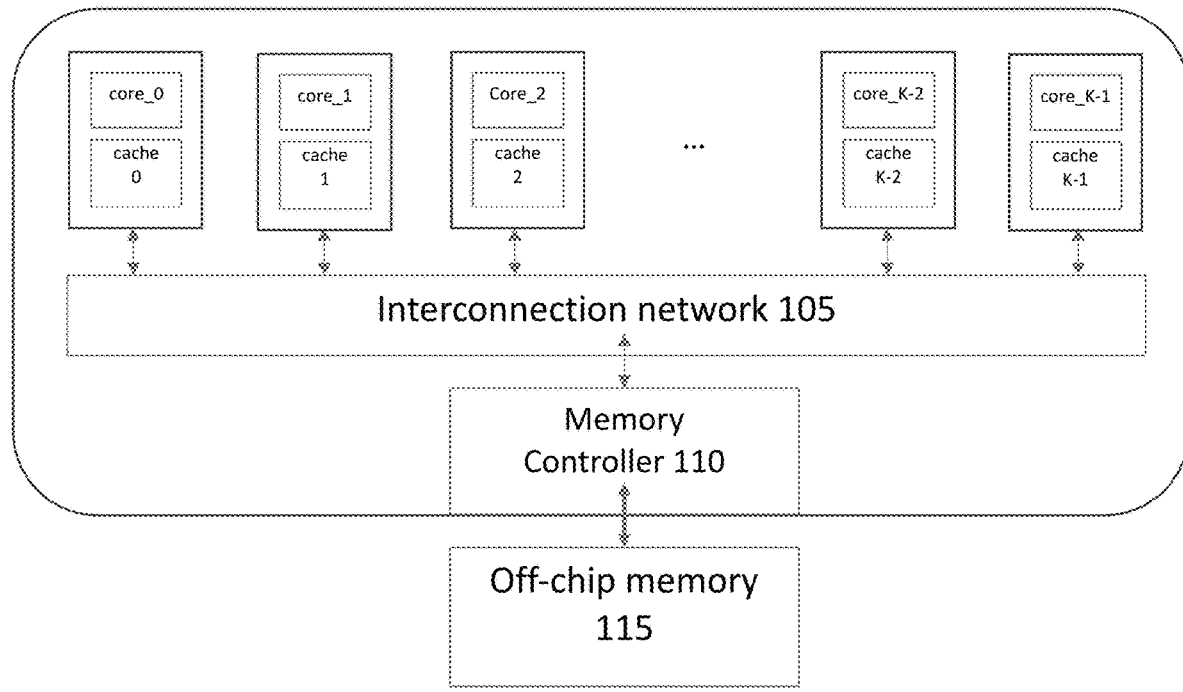
FIG. 1 shows a multi-core processor comprising K cores, numbered as 0, 1, . . . , K−1 as a typical example of a system with multiple caches.

FIG. 1 shows a multi-core processor comprising K cores, numbered as 0, 1, . . . , K−1. Each of the cores is paired with a cache. The nodes, including cores and caches, are connected to each other via an interconnection network 105. A memory controller 110 may be coupled to the interconnection network 105 to control the interconnections. In some cases off-chip memory 115 may also be included to supply data for the caches to read or write.

When a core accesses memory, it will first bring a cache line into its local cache and then read or write the data. While the cache works on the cache line locally, if other cores update the same cache line, the data in the local cache may be obsolete. This is one of many potential issues with the local caches in a multi-core processor, and cache coherence protocol is typically used to address these issues. Cache coherence logic keeps track of all the cache lines cached in the local caches and grants operation permissions based on sharing information. Typically, this information is kept in a directory, and when a local cache needs to bring in a cache line from the lower level of memory hierarchy, an entry for the cache line in the directory is checked. Depending on the sharing status of the cache line, permission is granted immediately or delayed until proper preparations are finished. The directory-based cache coherence protocol is not scalable to hundreds of cores. Even if one can implement it, the cost will be prohibitive.

2. Multi-Core Processor with Software-Hardware Co-Managed Cache System

Aspects of the present disclosure describe a cache system that is co-managed by software and hardware that obviates the need of a cache coherence protocol. In some embodiments, each local cache would have the following two hardware interfaces that are driven by software: (1) invalidate or flush its content to the lower level memory hierarchy; (2) specify memory regions that can be cached. Software would be responsible for specifying what regions can be cacheable, and may flexibly change memory from cacheable and not, depending on the stage of the software program. In some embodiments, invalidation can be done in one cycle. Multiple valid bits can be kept for each tag in the memory. A vector "valid bit vec" comprising a plurality of bits can be used. Only one of two bits may be used as the valid bit to indicate that this region of memory is holding valid information for use by the software.

Aspects of the present disclosure describe how to take advantage of spatial locality and temporal locality with local caches without needing to use complicated and expensive hardware implementation of cache coherence protocol. The local caches only cache certain memory regions that are specified by the program (software managed), due to the fact that the software is able to define the regions of memory that are cacheable. For example, the programmer of the software would know what memory regions to limit the software to. The hardware will handle bringing in the cache line from lower level of memory hierarchy and serving the requests from cores (hardware managed). Software may also invalidate or flush the cache to guarantee the correctness of the program.

According to aspects of the present disclosure, each local cache would have the following two hardware interfaces that are driven by software: (1) invalidate or flush its content to the lower level memory hierarchy; (2) specify memory regions that can be cached. The cache will not cache memory locations outside these memory regions. For example, the software may set just a few parameters for the hardware and controls when to invalidate or flush the content to the lower level memory hierarchy when the reading or writing data falls outside of the defined cacheable memory region.

According to aspects of the present disclosure, for each of the local caches, software defines the memory regions to be cached. Hardware may not have cache coherence capability, so it is software's responsibility to specify these regions properly to ensure the program runs correctly. For example, if an array, A, is read only for a certain period of time, software may set A as a cacheable memory region during this period of time. Once the program advances to a point where A may get updated in a write operation, the software will clear A from the cacheable region in the local caches by invalidation or flushing, thereby declaring that A is no longer in the cacheable region.

If a request to the local cache is external to the memory regions defined by software, the request will be forwarded to the lower level caches and no action is performed by the local caches. Any actions performed in the lower level caches will tend to be slower.

Figure 2:
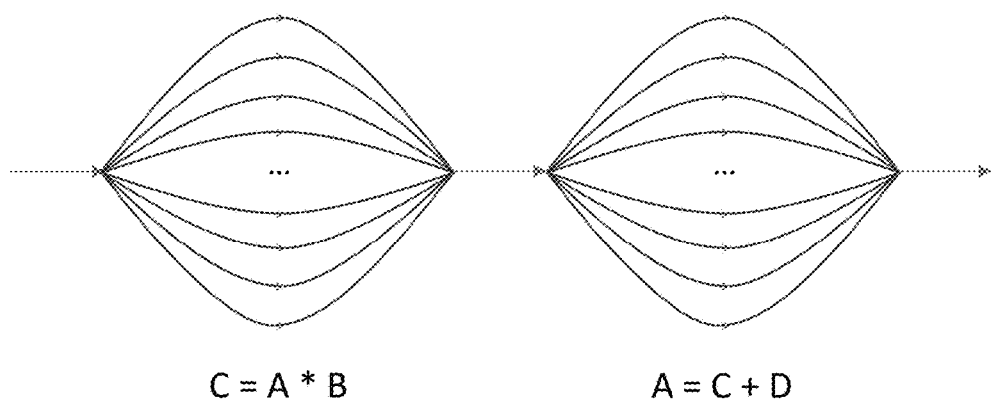
FIG. 2 shows a diagram of how software may dynamically update different regions of memory to be cacheable, according to some embodiments.

As an example of software changing the regions that are cacheable, FIG. 2 presents one diagrammatic illustration. In a first period of time, matrices A and B may be set as cacheable by the software, since A and B are initially read only matrices. An operation of calculating C=A*B may occur in the software program. After that, another operation may occur where A is updated with A=D+C. At this point, since A is now being changed, the cache may be invalidated by the software such that A is no longer part of the cacheable region, and now C and D are set as cacheable.

The following is some example pseudocode of software specifying the regions to be cached, according to aspects of the present disclosure, and thereby obviating the need for utilizing cache coherence protocol:

```
{
    //global variable A and B with 10 thousand elements
    int A[10000];
    int B[10000];
    //Let assume there are 10 cores and each core take care of
    1 thousand elements
    coreID = getCoreID( );
    SetReadOnlyregion(&A, &A+100);
    for(i=0;i<1000;i++)
        B[coreID*1000+i] = 10 * A[coreID*1000+i];
    FlushLocalCache( );
}
```

In some embodiments, it is also possible to set a memory region as cacheable even when there are memory writes for the region, if each core is working on a different part of the region and there are no dependencies between cores. For example, A=A+1, where every element of A is incremented by 1. Since each core operates on different elements of the matrix A, these elements are safe to be cached by each local cache, provided that the caches are using a write through mechanism or the new values are flushed to the lower level memory hierachy before they are used again by other cores. The software may be programmed to analyze these properties about different elements or facets that are being modified at the same time in the program, and then specify the boundaries of the cacheable regions accordingly. In addition, example implementations of aspects according to these principles include software specifying what regions are cacheable even if some of them are being written to, as long as they meet these conditions described herein.

Figures 3, 4:
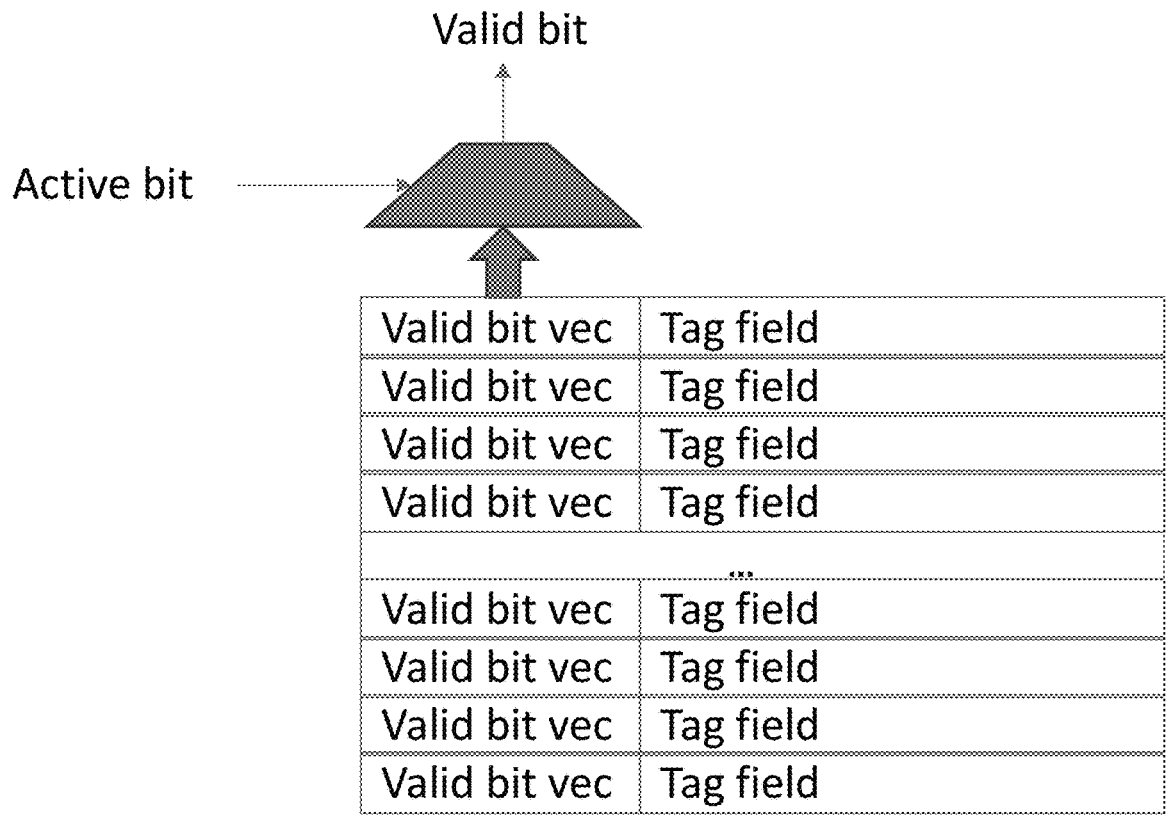
FIG. 3 shows an example of how a cache memory may be typically invalidated, by updating one entry per cycle.
FIG. 4 presents an example of how aspects of the present disclosure allow for a cache memory to be invalidated in one cycle, utilizing a vector of bits.

To invalidate a cache, the valid bits of all the cache lines may need to be cleared. That will take many cycles, if the valid bits are normally stored in a SRAM (static random-access memory), as shown in FIG. 3. In this case, only one entry can be updated in a cycle. If a cache can hold one thousand cache lines, and valid bits are stored in a SRAM, it will take one thousand cycles to clear all the valid bits, and the cache cannot be used during that time, for example. Under these conventional conditions, invalidating a cache is quite inefficient and slow. It is desirable to provide improved methods for invalidating a cache.

As shown in FIG. 4, according to aspects of the present disclosure, invalidation can be done in one cycle in most cases. Instead of a single valid bit for each tag in the SRAM, multiple valid bits can be kept for each tag in the SRAM. The cost of adding a small number of bits to each word of a SRAM is not that much in many cases. A vector "valid bit vec" comprising a plurality of bits can be used. For example, assume that the "valid bit vec" has only two bits. In a given time, only one of these two bits is used as the valid bit to indicate that this region of SRAM is holding valid information for use by the software. An "Active bit" is used to select one bit from these two bits. All bits in the "valid bit vec" are cleared during cache initialization. When a cache is used, the bit selected by the "Active bit" is used the same way as in a single valid bit design. When software decides to invalidate the cache, it only would need to change the "Active bit" to select the other bit of "valid bit vec." This would indicate that the region of SRAM governed by the "valid bit vec" is no longer part of the cacheable region, at least for a period of time. Since the "valid bit vec" is cleared during initialization, the cache becomes empty and it is done in one cycle. The memory for holding a cache line may need to be increased by a few bits for this solution. For example, SRAM holding memory with dimensions 20(Width)×1024 (Depth) may need to be replaced with a 21(W)×1024(D). This would be a change in hardware to the design of the size of each entry in the SRAM. However, speed may be dramatically increased because a single valid bit vector can be applied to the entire cache, allowing for the cache to be cleared in one cycle by clearing just the active bit of the vector.

Note that once the "Active bit" is switched, the previous valid bit needs to be cleared before it can be reused again in the future. This can be done while the cache is serving requests with the current valid bit selected by "Active bit." This process needs to be done one entry per cycle and takes at least as many cycles as the number of entries in the tag SRAM. If the clearing process has not finished before the bit is re-selected by "Active bit," the cache cannot be used until the process finishes. This process can occur in parallel with other operations of the software, such that very little time is lost in operation of the program, even though this re-initialization process of this specific region of memory may take longer.

Figure 5:
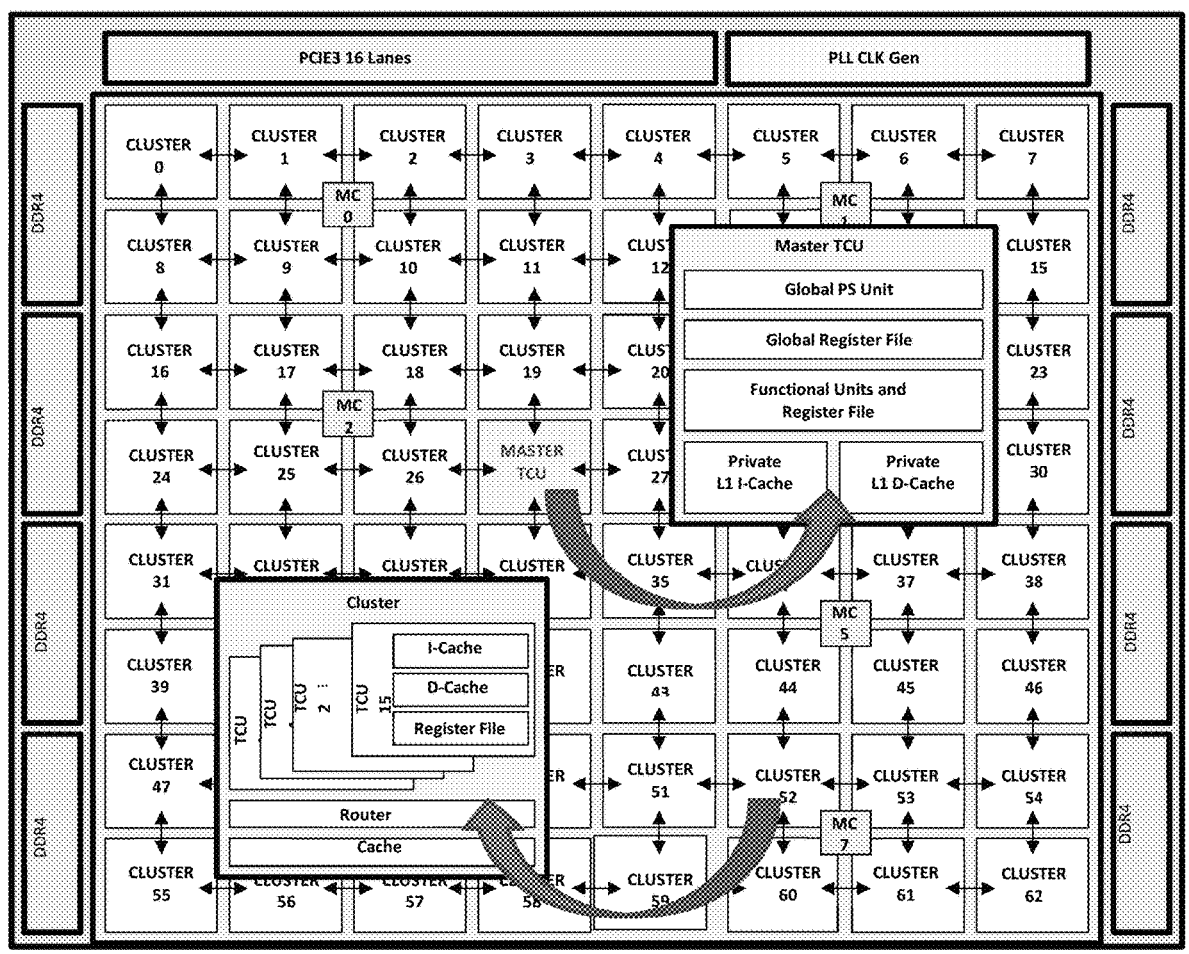
FIG. 5 shows an exemplary architecture of a multi-core processor used in an implementation of the software and hardware scheme of the present disclosures, according to some embodiments.

FIG. 5 shows an exemplary architecture of a multi-core processor used in an implementation of the software and hardware scheme of the present disclosures, according to some embodiments. The exemplary architecture includes a master thread control unit (MTCU), 64 clusters comprising thread control units (TCUs) and a router and a cache module, eight (8) memory controllers (MC). Each TCU may include its own local cache, and specifying what region of memory is available to be cached may be governed by a software program specifying what memory regions are cacheable for each of the TCUs. The TCUs may be configured to respond to software that conducts the methods of managing cacheable regions according to descriptions provided herein.

The master TCU (MTCU) executes the serial portion of the program and handles the special XMT instructions such as spawn and join instruction. The MTCU broadcasts the instructions in a parallel section to all clusters where they are copied to a local instruction buffer and later fetched by TCUs inside clusters. The Master TCU has its own cache, L0, that is only active during serial mode and applies write through. When the XMT processor enters the parallel mode, the Master TCU discards its local cache. The overhead of the flushing L0 cache is trivial since the write through mechanism is chosen. When XMT operates in serial mode, L0 cache is the first level cache of the MTCU and parallel memory modules provide the next level of the memory hierarchy, which is similar to a multilevel cache hierarchy in an advanced uniprocessor.

A cluster is a group of, for example, 16 TCUs and accompanying functional units. The block diagram of a cluster is shown in FIG. 5. A TCU can execute a thread in the parallel mode. TCUs have their own local registers and they are simple in-order pipelines including fetch, decode, execute, memory access and write back stages. The TCUs may have a very simple structure and do not aggressively pursue optimal performance. Given the limited chip area, the overall performance of the XMT is likely better when it has a larger number of simple TCUs than fewer but more advanced TCUs, because of the well known diminishing return of many instruction level parallelism (ILP) techniques. However, the XMT concept does not prevent TCUs from introducing any advanced techniques, since the thread level parallelism (TLP) that XMT is taking advantage of is orthogonal to ILP. Similar to a simultaneous multithreaded (SMT) processor, TCUs share some functional units: Multiplication/Division (M/D) unit and interconnection network port. If several TCUs assigned to a functional unit seek to use it, proper arbitration is used to queue all requests. The cluster has one load/store port to the interconnection network, which is shared by all TCUs inside the cluster. The store counter is used to flush the store operations by counting the number of pending stores.

In a XMT processor, prefix-sum operations are preferably executed very efficiently. The hardware implementation of the prefix-sum unit can accept binary input from multiple TCUs and the execution time does not depend on the number of TCUs that are sending requests to it. PS TCU module in the cluster combines all requests from TCUs and sends one request to the global prefix-sum unit. It is also responsible for distributing the results from the prefix-sum unit to the individual TCUs.

There are, for example, 64 independent shared cache modules and they are connected to clusters by an interconnection network. The address space is evenly divided among these cache modules. The parallel caches are used primarily for data, since the instructions for regular TCUs are broadcasted by the MTCU and stored in the instruction buffer. The interconnection network is a very important component of the XMT processor and needs to provide high bandwidth low latency communication between clusters and cache modules.

The exemplary multi-core processor of FIG. 5 supports a subset of MIPS I ISA as well as a few XMT specific instructions. The XMT specific instructions include spawn, join, sspawn (for single spawn: generate an additional thread while in parallel mode), ps, psm, and instructions for broadcasting, prefetching, and read-only caches.

Aspects of the present disclosure are not limited to the exemplary multi-core processor of FIG. 5, and can be apply to other parallel computing architectures.

What is claimed is:

1. A method of a computer program for managing a cache memory executed in a computing environment, the method comprising:
   specifying a first region of memory to function as a read-only region;
   specifying the first region of memory to be cacheable while the first region of memory functions as a read-only region;
   specifying a second region of memory to function as a read-only region;
   specifying the second region of memory to be cacheable while the second region of memory functions as a read-only region;
   changing at least a portion of the first region of memory to function as a write region;
   causing a write action in the first region of memory that changes memory content of the first region of memory;
   invalidating the first region of memory as cacheable upon causing the write action of the first region of memory;
   maintaining the second region of memory as cacheable while the first region is invalidated as cacheable;
   directing a first processor to perform a first write action in a third region of memory;
   directing a second processor to perform a second write action in the third region of memory, wherein the first write action does not possess any dependency with the second write action necessary to perform either the first or the second write actions; and
   based on not possessing any dependencies, specifying the third region of memory as a cacheable region while the first processor performs the first write action and the second processor performs the second write action.

2. The method of claim 1, wherein the second processor performs the second write action in parallel with the first processor performing the first write action.

3. The method of claim 1, wherein the first write action generates a first updated value in the third region of memory and the second write action generates a second updated value in the third region of memory, and the method further comprises:
   flushing the first updated value and the second updated value to a lower level memory region before the first updated value and the second update value are used by another processor.

4. The method of claim 1, wherein the first region of memory comprises a plurality of writeable memory registers, and invalidating the first region of memory occurs in one operation cycle.

5. The method of claim 1, wherein invalidating the first region of memory comprises:
   accessing a valid bit vector comprising at least a first bit indicating whether the first region of memory comprises valid information, and a second bit indicating whether the first region of memory is cacheable by the computer program; and
   updating the second bit to indicate that the first region of memory is no longer cacheable by the computer program.

6. The method of claim 5, further comprising initializing the first region of memory to be cacheable again by re-initializing the first bit and re-initializing the second bit.

7. A computer apparatus comprising:
at least one processor;
a memory communicatively coupled to the at least one processor and configured to be cacheable by a software program; and
the at least one processor configured to execute instructions of the software program comprising:
specifying a first region of the memory to function as a read-only region;
specifying the first region of the memory to be cacheable while the first region of memory functions as a read-only region;
specifying a second region of the memory to function as a read-only region;
specifying the second region of the memory to be cacheable while the second region of memory functions as a read-only region;
changing at least a portion of the first region of memory to function as a write region;
causing a write action in the first region of the memory that changes memory content of the first region of the memory;
invalidating the first region of the memory as cacheable upon causing the write action of the first region of memory;
maintaining the second region of the memory as cacheable while the first region is invalidated as cacheable;
directing a first processor to perform a first write action in a third region of memory;
directing a second processor to perform a second write action in the third region of memory, wherein the first write action does not possess any dependency with the second write action necessary to perform either the first or the second write actions; and
based on not possessing any dependencies, specifying the third region of memory as a cacheable region while the first processor performs the first write action and the second processor performs the second write action.

8. The apparatus of claim 7, wherein the second processor performs the second write action in parallel with the first processor performing the first write action.

9. The apparatus of claim 7, further comprising a lower level memory communicatively coupled to the memory and the at least one processor; and
wherein the first write action generates a first updated value in the third region of the memory and the second write action generates a second updated value in the third region of the memory, and the instructions further comprise:
flushing the first updated value and the second updated value to the lower level memory region before the first updated value and the second update value are used by another processor.

10. The apparatus of claim 7, wherein the first region of the memory comprises a plurality of writeable memory registers, and invalidating the first region of memory occurs in one operation cycle.

11. The apparatus of claim 7, wherein invalidating the first region of the memory comprises:
accessing a valid bit vector comprising at least a first bit indicating whether the first region of the memory comprises valid information, and a second bit indicating whether the first region of the memory is cacheable by the computer program; and
updating the second bit to indicate that the first region of the memory is no longer cacheable by the computer program.

12. The apparatus of claim 11, wherein the instructions further comprise initializing the first region of the memory to be cacheable again by re-initializing the first bit and re-initializing the second bit.

* * * * *